W. A. ADAMS.
ENSILAGE PROTECTOR.
APPLICATION FILED MAY 2, 1914.

1,167,871.

Patented Jan. 11, 1916.

Inventor
William A. Adams.

Witnesses
Edw. S. Hall.
W. E. Nack Jr.

By Richard Bowen
Attorney

UNITED STATES PATENT OFFICE.

WILLIAM AUSTON ADAMS, OF LA GRANGE, KENTUCKY.

ENSILAGE-PROTECTOR.

1,167,871. Specification of Letters Patent. Patented Jan. 11, 1916.

Application filed May 2, 1914. Serial No. 835,979.

*To all whom it may concern:*

Be it known that I, WILLIAM AUSTON ADAMS, citizen of the United States, residing at La Grange, in the county of Oldham and State of Kentucky, have invented certain new and useful Improvements in Ensilage-Protectors, of which the following is a specification.

My invention relates to improvements in ensilage protectors or covers to be used in connection with silos of various types as a means whereby the moisture of the ensilage is indefinitely retained.

In silo construction heretofore, the ensilage at the top of the silo, after a short period of time, becomes hard and dry, and finally utterly unfit for use. To avoid this absolute waste, the present invention is designed, said invention consisting of a cover or protector movable within the silo to rest upon the ensilage therein, said cover, by reason of its disposition relatively to the ensilage retaining indefinitely the moisture therein.

The invention also contemplates means for adjusting the cover relatively to the silo base.

The above and additional objects are accomplished by such means as are illustrated in their preferred embodiment in the accompanying drawings, described in the following specification and then more particularly pointed out in the claims which are appended hereto and form a part of this application.

In describing my invention in detail reference will be had to the accompanying drawings wherein like characters denote like or corresponding parts throughout the several views, and in which:—

Figure 1:
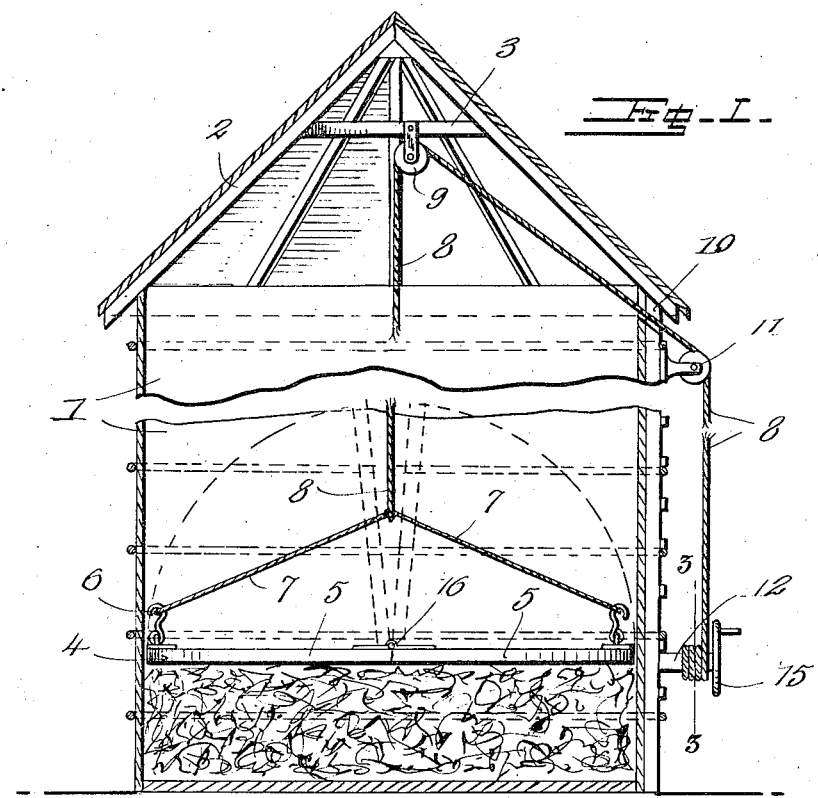
Figure 2:
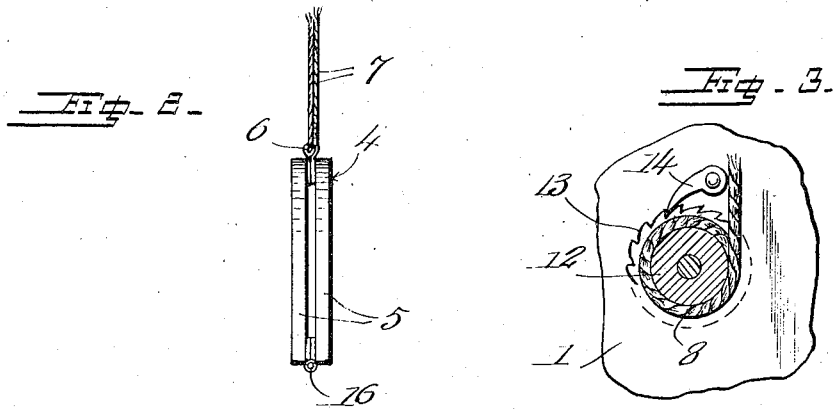
Figure 3:
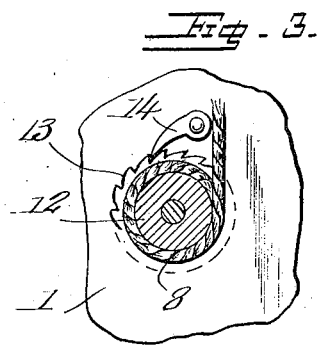

Figure 1 illustrates a silo in section and partly broken away, the device comprising the present invention being arranged operatively therein; Fig. 2 is an edge view of the protector, folded; and Fig. 3 is an enlarged section on the line 3—3 of Fig. 1.

Referring now to the drawings by numerals, 1 designates a silo, 2 the silo roof and 3 a beam extending across the interior of the said roof to serve as a support for the protector device, designated as an entirety by the numeral 4, comprising the present invention. Said protector device 4 in its preferred embodiment includes a cover, shaped to conform to the interior wall of the silo within which it is arranged, said cover comprising a pair of hingedly connected cover sections 5 to each of which is attached, preferably at diametrically opposite points, and as indicated at 6 a suitable flexible element 7, the latter having attached thereto at a point preferably equi-distant its ends, an operating element designated 8, the latter operating over a pulley 9 carried by the beam 3, from which point it extends laterally through an opening 10 in the silo wall, said element passing over a second pulley 11 and depending, as indicated in Fig. 1 to a drum 12 upon which it is wound and to which it is attached. Said drum 12 has associated therewith a ratchet 13 and pivoted pawl 14 as well as a handle 15, the former providing for the retention of the drum against movement, and the latter providing for the operation of the drum when the pawl 14 is disengaged. The sections 5 of the cover 4 correspond in size, said sections being hinged at the point designated 16.

When it is desired that ensilage be placed in the silo, drum 12 is rotated, pawl 14 having been removed, and, by reason of its connection with the element 7, sections 5 of the cover are first swung into the position indicated in dotted lines in Fig. 1 or in full lines in Fig. 2, and then bodily raised to the desired height. Ensilage is then placed in the silo through the silo door (not shown). The desired amount of ensilage having been stored, pawl 14 is again disengaged, and cover 4 allowed to drop, by its own weight, to press the fresh ensilage and completely cover and protect the same, thus preserving the moisture originally therein and obviating the waste incident to the construction of silos now in use, without in any way complicating the structure of the silo, or adding materially to its original cost.

From the foregoing, taken in connection with the accompanying drawings, it will be noted that the said protector or cover may be raised out of engagement with the ensilage when it is desired that the same be used; that the operation necessary to the raising and lowering of the cover is simple in the extreme and effected from a point upon the exterior of the silo, preferably as shown in Fig. 1; and that by dividing the cover 4 and hinging the cover sections as indicated at 16, the said cover may be lowered until in engagement with the silo and then, by reason of the weight of the respective cover sections, firmly press the ensilage to be stored.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claims.

Having thus fully described my invention, what I claim as new and desire to secure by Letters Patent, is:—

1. An ensilage cover for use in silos comprising a pair of hingedly connected relatively movable cover sections, a flexible element connecting said sections, and a means operable to first move said sections into a contiguous vertical position and subsequently bodily elevate the cover, substantially as described.

2. In means for protecting the ensilage within a silo, the combination with the silo, of a cover comprising a pair of hingedly connected cover sections, said cover being shaped to conform to the configuration of the inner wall of the silo, a flexible element attached to the respective cover sections at diametrically opposite points, a second flexible element attached to said first mentioned flexible element at points equi-distant its ends, pulleys over which the said second flexible element is arranged, and means including a winding drum to which said second element is attached, said drum being arranged upon a point exteriorly of the silo and operable to raise and lower said cover relatively to the ensilage therein, as and for the purpose set forth.

In testimony whereof I affix my signature in presence of two witnesses.

WILLIAM AUSTON ADAMS.

Witnesses:
  ROBERT D. LOWE,
  J. W. LEE.